(12) United States Patent
Watson et al.

(10) Patent No.: US 10,694,006 B1
(45) Date of Patent: Jun. 23, 2020

(54) GENERATION OF DESCRIPTIVE DATA FOR PACKET FIELDS

(71) Applicant: Barefoot Networks, Inc., Palo Alto, CA (US)

(72) Inventors: Gregory C. Watson, Palo Alto, CA (US); Srivathsa Dhruvanarayan, Saratoga, CA (US); Glen Raymond Gibb, Menlo Park, CA (US); Constantine Calamvokis, Bath (GB); Aled Justin Edwards, Charfield (GB)

(73) Assignee: Barefoot Networks, Inc., Santa Clara, CA (US)

( * ) Notice: Subject to any disclaimer, the term of this patent is extended or adjusted under 35 U.S.C. 154(b) by 170 days.

(21) Appl. No.: 15/678,565

(22) Filed: Aug. 16, 2017

Related U.S. Application Data

(60) Provisional application No. 62/503,307, filed on May 8, 2017, provisional application No. 62/488,800, filed on Apr. 23, 2017.

(51) Int. Cl.
| | |
|---|---|
| *H04L 12/935* | (2013.01) |
| *H04L 29/06* | (2006.01) |
| *H04L 12/861* | (2013.01) |
| *H04L 12/741* | (2013.01) |

(52) U.S. Cl.
CPC ............ *H04L 69/22* (2013.01); *H04L 45/745* (2013.01); *H04L 49/3063* (2013.01); *H04L 49/9042* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 7,539,777 B1 * | 5/2009 | Aitken | H04L 69/16 370/466 |
| 7,961,734 B2 | 6/2011 | Panwar et al. | |
| 8,514,855 B1 | 8/2013 | Robertson et al. | |
| 8,638,793 B1 | 1/2014 | Ben-Mayor et al. | |

(Continued)

OTHER PUBLICATIONS

Bosshart, Patrick, et al., "Forwarding Metamorphosis: Fast Programmable Match-Action Processing in Hardware for SDN," SIGCOMM'13, Aug. 12-16, 2013,12 pages, ACM, Hong Kong, China.

(Continued)

*Primary Examiner* — Edan Orgad
*Assistant Examiner* — Emmanuel K Maglo
(74) *Attorney, Agent, or Firm* — Compass IP Law PC

(57) ABSTRACT

Some embodiments provide a method for a parser of a processing pipeline. The method receives a packet for processing by a set of match-action stages of the processing pipeline. The method stores packet header field (PHF) values from a first set of PHFs of the packet in a set of data containers. The first set of PHFs are for use by the match-action stages. For a second set of PHFs not used by the match-action stages, the method generates descriptive data that identifies locations of the PHFs of the second set within the packet. The method sends (i) the set of data containers to the match-action stages and (ii) the packet data and the generated descriptive data outside of the match-action stages to a deparser that uses the packet data, generated descriptive data, and the set of data containers as modified by the match-action stages to reconstruct a modified packet.

16 Claims, 12 Drawing Sheets

(56) References Cited

U.S. PATENT DOCUMENTS

| | | | |
|---|---|---|---|
| 8,788,512 B2 | 7/2014 | Asaad et al. | |
| 8,971,338 B2 | 3/2015 | Mishra et al. | |
| 9,055,004 B2 | 6/2015 | Edsall et al. | |
| 9,712,439 B2 | 7/2017 | Bosshart et al. | |
| 9,825,862 B2 | 11/2017 | Bosshart | |
| 9,826,071 B2 | 11/2017 | Bosshart | |
| 10,225,381 B1 | 3/2019 | Bosshart | |
| 2003/0046429 A1 | 3/2003 | Sonksen | |
| 2003/0063345 A1* | 4/2003 | Fossum | H04B 10/0773 398/58 |
| 2004/0123220 A1 | 6/2004 | Johnson et al. | |
| 2004/0165588 A1 | 8/2004 | Pandya | |
| 2005/0060428 A1 | 3/2005 | Corl, Jr. et al. | |
| 2005/0086353 A1 | 4/2005 | Shirakawa et al. | |
| 2005/0129059 A1* | 6/2005 | Jiang | H04L 12/437 370/466 |
| 2005/0149823 A1* | 7/2005 | Lee | H03M 13/096 714/758 |
| 2005/0198531 A1 | 9/2005 | Kaniz et al. | |
| 2006/0002386 A1 | 1/2006 | Yik et al. | |
| 2006/0114914 A1* | 6/2006 | Anand | H04L 49/90 370/395.53 |
| 2007/0195761 A1 | 8/2007 | Tatar et al. | |
| 2007/0195773 A1 | 8/2007 | Tatar et al. | |
| 2008/0175449 A1* | 7/2008 | Fang | G06F 21/32 382/124 |
| 2009/0006605 A1* | 1/2009 | Chen | H04L 49/90 709/224 |
| 2010/0085891 A1 | 4/2010 | Kind et al. | |
| 2010/0140364 A1* | 6/2010 | Nordberg | G05B 15/02 236/51 |
| 2010/0145475 A1* | 6/2010 | Bartels | G05B 9/02 700/3 |
| 2012/0177047 A1* | 7/2012 | Roitshtein | H04L 69/22 370/392 |
| 2013/0346814 A1 | 12/2013 | Zadigian et al. | |
| 2014/0040527 A1 | 2/2014 | Kanigicherla et al. | |
| 2014/0241362 A1 | 8/2014 | Bosshart et al. | |
| 2014/0244966 A1 | 8/2014 | Bosshart et al. | |
| 2014/0328180 A1 | 11/2014 | Kim et al. | |
| 2014/0334489 A1 | 11/2014 | Bosshart et al. | |
| 2015/0081833 A1 | 3/2015 | Pettit et al. | |
| 2015/0131666 A1 | 5/2015 | Kang et al. | |
| 2015/0156288 A1 | 6/2015 | Lu et al. | |
| 2016/0094460 A1 | 3/2016 | Shelar et al. | |
| 2016/0323243 A1 | 11/2016 | LeVasseur et al. | |
| 2016/0330127 A1 | 11/2016 | Kim et al. | |
| 2017/0034082 A1 | 2/2017 | Pfaff et al. | |
| 2017/0063690 A1* | 3/2017 | Bosshart | H04L 45/7457 |
| 2017/0064047 A1* | 3/2017 | Bosshart | H04L 69/22 |
| 2017/0126588 A1 | 5/2017 | Anand et al. | |
| 2017/0142011 A1 | 5/2017 | Zhang et al. | |
| 2017/0289034 A1 | 10/2017 | Bosshart et al. | |
| 2018/0287819 A1 | 10/2018 | Mayer-Wolf et al. | |

OTHER PUBLICATIONS

Kaufmann, Antoine, et al., "High Performance Packet Processing with FlexNIC," ASPLOS'16, Apr. 2-6, 2016, 15 pages, ACM, Atlanta, GA, USA.

Non-Published commonly owned U.S. Appl. No. 15/729,555, filed Oct. 10, 2017, 40 pages, Barefoot Networks, Inc.

Non-Published commonly owned U.S. Appl. No. 15/729,593, filed Oct. 10, 2017, 40 pages, Barefoot Networks, Inc.

Non-Published commonly owned U.S. Appl. No. 15/678,549, filed Aug. 16, 2017, 41 pages, Barefoot Networks, Inc.

Non-Published commonly owned U.S. Appl. No. 15/678,556, filed Aug. 16, 2017, 42 pages, Barefoot Networks, Inc.

Non-Published commonly owned U.S. Appl. No. 16/288,074, filed Feb. 27, 2019, 47 pages, Barefoot Networks, Inc.

\* cited by examiner

US 10,694,006 B1

GENERATION OF DESCRIPTIVE DATA FOR PACKET FIELDS

BACKGROUND

In Software Defined Networking (SDN), the control plane is physically separated from the data plane. Some hardware switches use a match-action paradigm, but these switches are generally not especially flexible because they process a fixed set of fields with a limited repertoire of packet processing actions. One area to improve is the flexibility of these hardware switches to allow for processing of all types of packets.

BRIEF SUMMARY

Some embodiments of the invention provide a hardware forwarding element with one or more packet processing pipelines that include a parser, a set of match-action stages, and a deparser. The novel deparser of some embodiments receives packet header field values from the match-action stages (e.g., from the last match-action stage) and combines this data with packet payload data received directly from the parser (i.e., sent to the deparser outside of the match-action stages). The parser, match-action stages, and deparser are all configurable (e.g., via a control plane process that configures the forwarding element according to administrator-provided instructions).

In some embodiments, the deparser receives (i) the packet header field values stored in a set of data containers and (ii) a set of data indicating which packet header fields should be included in the packet that the deparser constructs. The deparser uses this set of data along with a list of data container identifiers for possible packet header fields in order to generate an ordered list of references to the data containers. Based on this ordered list, the deparser constructs the packet using the packet header field values stored in the referenced containers. The deparser, in some embodiments, also receives the packet payload data directly from the parser, and combines the referenced packet header field values with the received payload data.

In some embodiments, the parser receives a packet as an ordered set of data. Based on its own instructions and analysis of the packet, the parser identifies packet header fields of the packet and stores the packet header field values in the set of data containers, collectively referred to in some embodiments as a packet header vector (PHV). These data containers are differentiated (e.g., with identifiers), and the parser stores specific bits of specific packet header fields in identifiable locations within the PHV. The parser then provides this PHV to the match-action stages, which match on the PHV values and perform actions that may include modifying one or more of the packet header field values stored in the PHV. After the last match-action stage, the (possibly modified) PHV is provided to the deparser, so that the deparser can reconstruct the packet.

The remainder of the packet that is not stored in the PHV (which may include packet headers for additional protocols that are not analyzed by the forwarding element, etc.), referred to as the payload, is sent directly from the parser to the deparser, via a connection outside of the match-action stages. Some embodiments send the portion of the packet that is not stored in the PHV, while other embodiments send the entire packet via this direct connection between the parser and deparser.

In some embodiments, the deparser stores a list of data container identifiers for the packet header fields of all possible protocols (e.g., Ethernet, IP, TCP, UDP, etc.) that could be included in a packet processed by the forwarding element. This list, also referred to as a dictionary (or field dictionary), identifies for each bit (or each byte) of a protocol's packet header, the data container (and the bits within that data container) where the deparser can find that bit (or byte). As mentioned, the deparser receives, along with the PHV data containers, a set of data that indicates which packet header fields to include in the constructed packet. In some embodiments, this is a list of the protocols to include in the packet and an order for these protocols within the packet header. The deparser uses the set of data indicating which protocols to include and combines this with the dictionary information to identify an ordered set of references to PHV data container locations that should be used to construct the packet headers.

The deparser of some embodiments includes a crossbar that takes as inputs (i) the data containers of the PHV and (ii) the ordered set of PHV data container references and outputs the packet header for the constructed packet. This packet header is combined with the payload received directly from the parser to construct the completed packet. If the processing pipeline is an ingress pipeline (i.e., processing packets received at an ingress port of the forwarding element, the deparser of some embodiments provides the constructed packet to a traffic management unit that enqueues the packet for output via a particular port of the forwarding element. If the processing pipeline is an egress pipeline (i.e., processing packets from the traffic management unit for output via a particular port of the forwarding element), the deparser of some embodiments sends the constructed packet out of the forwarding element via this port.

Some embodiments additionally enable the parser to only store in the PHV data containers the packet header field values that may be required by the match-action stages, with descriptive data sent directly to the deparser (along with the packet data) that identifies the locations in the packet data to find the packet header field values not included in the PHV. In such embodiments, the parser sends to the deparser the entire packet received by the pipeline, rather than only the payload, so that the deparser can use this packet data to construct the packet header for the outgoing packet, along with the packet header field values in the PHV data containers. The parser generates the descriptive data for each packet header field (or contiguous block of packet header fields) not included in the PHV, and the deparser uses this descriptive data to identify the location in the packet data of the packet header field values to use in constructing the packet.

In some embodiments, the descriptive data generated by the parser for a particular portion of the packet data provides a starting location (e.g., a starting bit location) in the packet data and a length for the particular portion that is not included in the PHV. In addition, some embodiments include a tag that specifies the packet header field or fields included in the particular portion. The parser is configured to always tag the same packet header field or set of packet header fields with the same tag, so that the deparser can use the tag to identify the descriptive data (and thus the location of the packet header field within the packet data). In addition, some embodiments also include checksum data for at least a subset of the packet data portions with the descriptive data for these packet data portions. This allows the deparser to easily include this checksum data in the protocol header (e.g., for Internet Protocol header data portions).

Some embodiments generate separate descriptive data (e.g., a separate starting location, length, tag, and/or checksum) for each packet header field that is not stored in a PHV container. Other embodiments, however, group contiguous blocks of packet header fields together, thereby reducing the number of separate pieces of descriptive data that are sent to the deparser along with the packet data. For instance, in an IPv4 header, if the match-action stages do not require any of the version, IHL, DSCP, and ECN fields (the first four fields of the protocol header), some embodiments provide a single piece of descriptive data for this block of packet data, rather than four separate descriptions for each separate field.

The use of this descriptive data enables substantial size savings in the PHV. Without this descriptive data, all of the packet header fields up to the end of the last desired protocol header are put into the PHV containers, even if those header fields are not needed by the match-action stages (as the packet data sent directly to the deparser is used only for the payload). Using this descriptive data, however, means that the packet header fields not required by the match-action stages need not be duplicated into the PHV containers.

When the deparser receives (i) the PHV from the last match-action stage (along with the indicator as to which protocols to include in the constructed packet) and (ii) the packet data and descriptive data via the direct connection from the parser, the deparser uses all of this data to construct the eventual packet. The deparser, as described above, generates an ordered list of references for constructing the packet header. In this case, the ordered list includes both references to PHV locations (as described above) as well as references to locations within the packet data received from the parser. These references to packet data locations are generated by the parser using the descriptive data from the parser, which is identified by a tag that specifies the packet header field(s) to which the descriptive data refers. Thus, for example, the ordered list might refer to a location within a first PHV container for a first packet header field, then to a location within the packet data for a second packet header field (or set of fields), and then to a location within a second PHV container for a third packet header field.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide a hardware forwarding element with one or more packet processing pipelines that include a parser, a set of match-action stages, and a deparser. The novel deparser of some embodiments receives packet header field values from the match-action stages (e.g., from the last match-action stage) and combines this data with packet payload data received directly from the parser (i.e., sent to the deparser outside of the match-action stages). The parser, match-action stages, and deparser are all configurable (e.g., via a control plane process that configures the forwarding element according to administrator-provided instructions).

In some embodiments, the deparser receives (i) the packet header field values stored in a set of data containers and (ii) a set of data indicating which packet header fields should be included in the packet that the deparser constructs. The deparser uses this set of data along with a list of data container identifiers for possible packet header fields in order to generate an ordered list of references to the data containers. Based on this ordered list, the deparser constructs the packet using the packet header field values stored in the referenced containers. The deparser, in some embodiments, also receives the packet payload data directly from the parser, and combines the referenced packet header field values with the received payload data.

Figure 1:
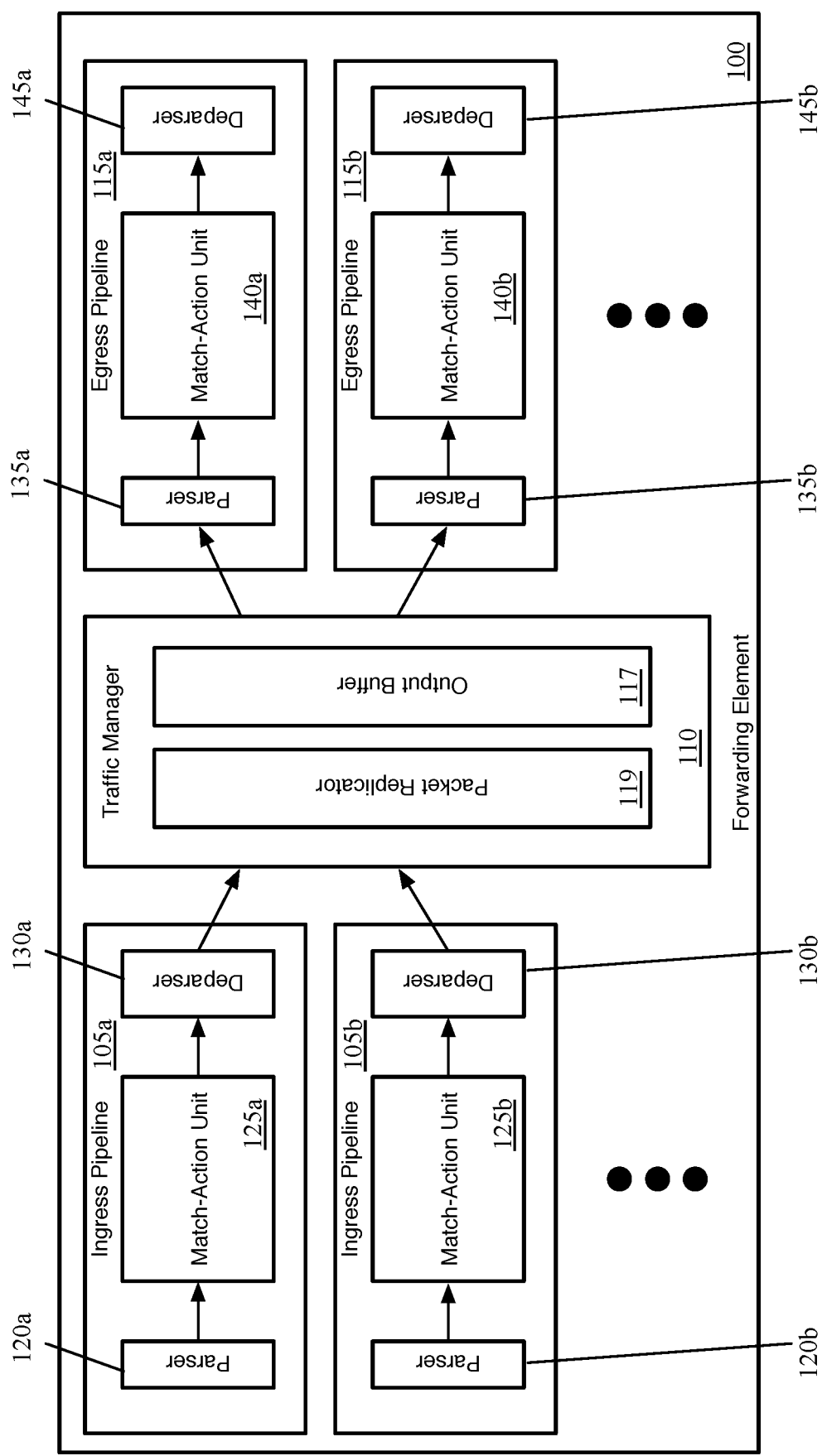
FIG. 1 conceptually illustrates the structure of a hardware forwarding element of some embodiments.

FIG. 1 conceptually illustrates the structure of such a hardware forwarding element of some embodiments. Specifically, FIG. 1 illustrates several ingress pipelines 105, a traffic management unit (referred to as a traffic manager) 110, and several egress pipelines 115. When the forwarding element 100 receives a packet, in some embodiments the packet is directed to one of the ingress pipelines 105 (each of which may correspond to one or more ports of the forwarding element). After passing through the selected ingress pipeline 105, the packet is sent to the traffic manager 110, where the packet is enqueued and placed in the output buffer 117. The traffic manager 110 then dispatches the packet to the appropriate egress pipeline 115 (each of which may correspond to one or more ports of the forwarding element). In some embodiments, there is no necessary correlation between which of the ingress pipelines 105 processes a packet and to which of the egress pipelines 115 the traffic manager 110 dispatches the packet. That is, a packet might be initially processed by ingress pipeline 105*b* after receipt through a first port, and then subsequently by egress pipeline 115*a* to be sent out a second port, etc.

Each ingress pipeline 105 includes a parser 120, a match-action unit (MAU) 125, and a deparser 130. Similarly, each egress pipeline 115 includes a parser 135, a MAU 140, and a deparser 145. The parser 120 or 135, in some embodiments, receives a packet as a formatted collection of bits in a particular order, and parses the packet into its constituent header fields. The parser starts from the beginning of the packet and assigns these header fields to fields (e.g., data containers) of a packet header vector for processing. In some embodiments, the parser 120 or 135 separates out the packet headers (up to a designated point) from the payload of the packet, and sends the payload (or the entire packet, including the headers and payload) directly to the deparser without passing through the MAU processing (e.g., on a single wire). The parser of some embodiments is further described below by reference to FIG. 3.

The MAU 125 or 140 performs processing on the packet data (i.e., the packet header vector). In some embodiments, the MAU includes a sequence of stages, with each stage including one or more match tables and an action engine. Each match table includes a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage performs the actions on the packet, which is then sent to the next stage of the MAU.

The deparser 130 or 145 reconstructs the packet using the packet header vector as modified by the MAU 125 or 140 and the payload received directly from the parser 120 or 135. The deparser constructs a packet that can be sent out over the physical network, or to the traffic manager 110. In some embodiments, the deparser constructs this packet based on data received along with the packet header vector that specifies the protocols to include in the packet header, as well as its own stored list of data container locations for each possible protocol's header fields.

The traffic manager 110, as shown, includes a packet replicator 119 and the previously-mentioned output buffer 117. In some embodiments, the traffic manager 110 may include other components, such as a feedback generator for sending signals regarding output port failures, a series of queues and schedulers for these queues, as well as additional components. The packet replicator 119 of some embodiments performs replication for broadcast/multicast packets, generating multiple packets to be added to the output buffer (e.g., to be distributed to different egress pipelines).

The output buffer 117 is part of a queuing and buffering system of the traffic manager in some embodiments. The traffic manager 110 provides a shared buffer that accommodates any queuing delays in the egress pipelines. In some embodiments, this shared output buffer 117 stores packet data, while references (e.g., pointers) to that packet data are kept in different queues for each egress pipeline 115. The egress pipelines request their respective data from the common data buffer using a queuing policy that is control-plane configurable. When a packet data reference reaches the head of its queue and is scheduled for dequeuing, the corresponding packet data is read out of the output buffer 117 and into the corresponding egress pipeline 115. In some embodiments, packet data may be referenced by multiple pipelines (e.g., for a multicast packet). In this case, the packet data is not removed from this output buffer 117 until all references to the packet data have cleared their respective queues.

Figure 2:
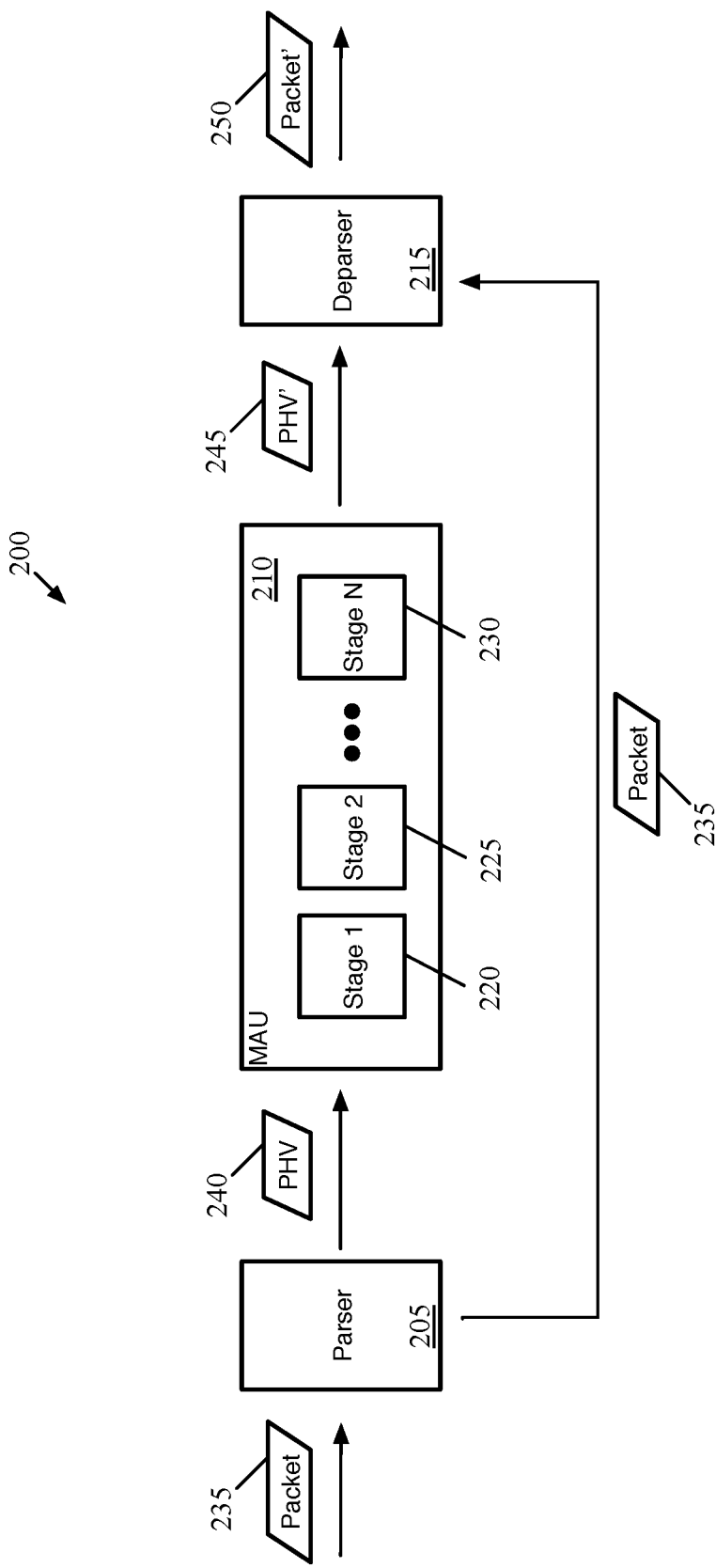
FIG. 2 conceptually illustrates the flow of data through a packet processing pipeline of some embodiments.

FIG. 2 conceptually illustrates the flow of data through a packet processing pipeline 200 of some embodiments (e.g., one of the ingress or egress pipelines of FIG. 1) in more detail. As in FIG. 1, the packet processing pipeline 200 includes a parser 205, a match-action unit 210, and a deparser 215. The match-action unit 210 includes several stages 220-230 for processing packets received by the pipeline. It should be understood that the term packet may be used herein to refer to various formatted collections of bits that may be sent across a network, such as Ethernet frames, IP packets, TCP segments, UDP datagrams, etc. While this and the examples below refer to packets, it should be understood that the invention should not be limited to any specific format or type of data message.

The parser 205, as described in more detail below by reference to FIG. 3, receives a packet 235 and extracts header fields into a packet header vector. In some embodiments, the parser 205 receives a packet as a formatted collection of bits in a particular order, and parses the packet into its constituent header fields according to a parse graph state machine. That is, the parser 205 starts from the beginning of the packet and parses each header field in order, assigning these header fields to fields (e.g., data containers) of a packet header vector 240, which is sent to the match-action unit 210. Based on the values of certain fields (e.g., the Ethertype field of an Ethernet header, the Protocol field of an Internet Protocol header, etc.), the parser 205 can determine the structure of the next set of header fields. The parser 205 places specific header field bits into specific locations in the PHV data containers, in some embodiments, so that the MAU 210 and deparser 215 can locate the packet header field values for evaluation (by the MAU) and packet construction (by the deparser). The packet header fields stored in the PHV 240 include header fields up to a specific point of the packet (e.g., as determined by the parse graph state machine). In addition, as shown, the parser sends the entire packet 235 directly to the deparser via a separate path (e.g., via separate wiring) that does not pass through the MAU 210. In other embodiments, the parser sends only the payload (i.e., the portion of the packet not stored in the PHV 240) via this direct route to the deparser 215.

The MAU 210 processes the packet by analyzing and modifying the PHV 240 over the course of several match-action stages 220-230. Each of these match-action stages of some embodiments includes (i) a match sub-unit that compares one or more fields of the PHV 240 to flow entries in one or more match tables to identify one or more matching flow entries and (ii) an action sub-unit that performs an action or actions specified by the identified matching flow entries. These actions may include forwarding the packet out a specific port, dropping the packet, mirroring the packet to a buffer on the forwarding element, specifying the next stage in the MAU 210 for processing the packet, etc. In addition, the actions may modify one or more fields of the PHV (e.g., modifying a MAC or IP address, decreasing the time to live, etc.). The MAU 210 outputs a modified PHV (PHV') 245 to the deparser 215.

Thus, the deparser 215 receives the modified PHV 245 as well as the full data packet 235. The deparser 215 combines these two sets of data into a modified packet 250, which is output (e.g., to the traffic manager, or to an output port of the forwarding element). Though not shown here, in some embodiments the deparser receives a set of data along with the modified PHV 245 that indicates which packet header fields should be included in the output packet 250. The deparser uses this set of data along with stored data that specifies locations in the PHV 245 for the bits of each packet header field to generate an ordered list of references to locations in the PHV 245. Based on this list, the deparser 245 constructs the modified packet 250 using (i) the packet header field values stored in the PHV 245 and (ii) the packet 235 (i.e., for the payload portion of the packet, which is unchanged). The deparser is described in more detail below by reference to FIGS. 4-6.

Figure 3:
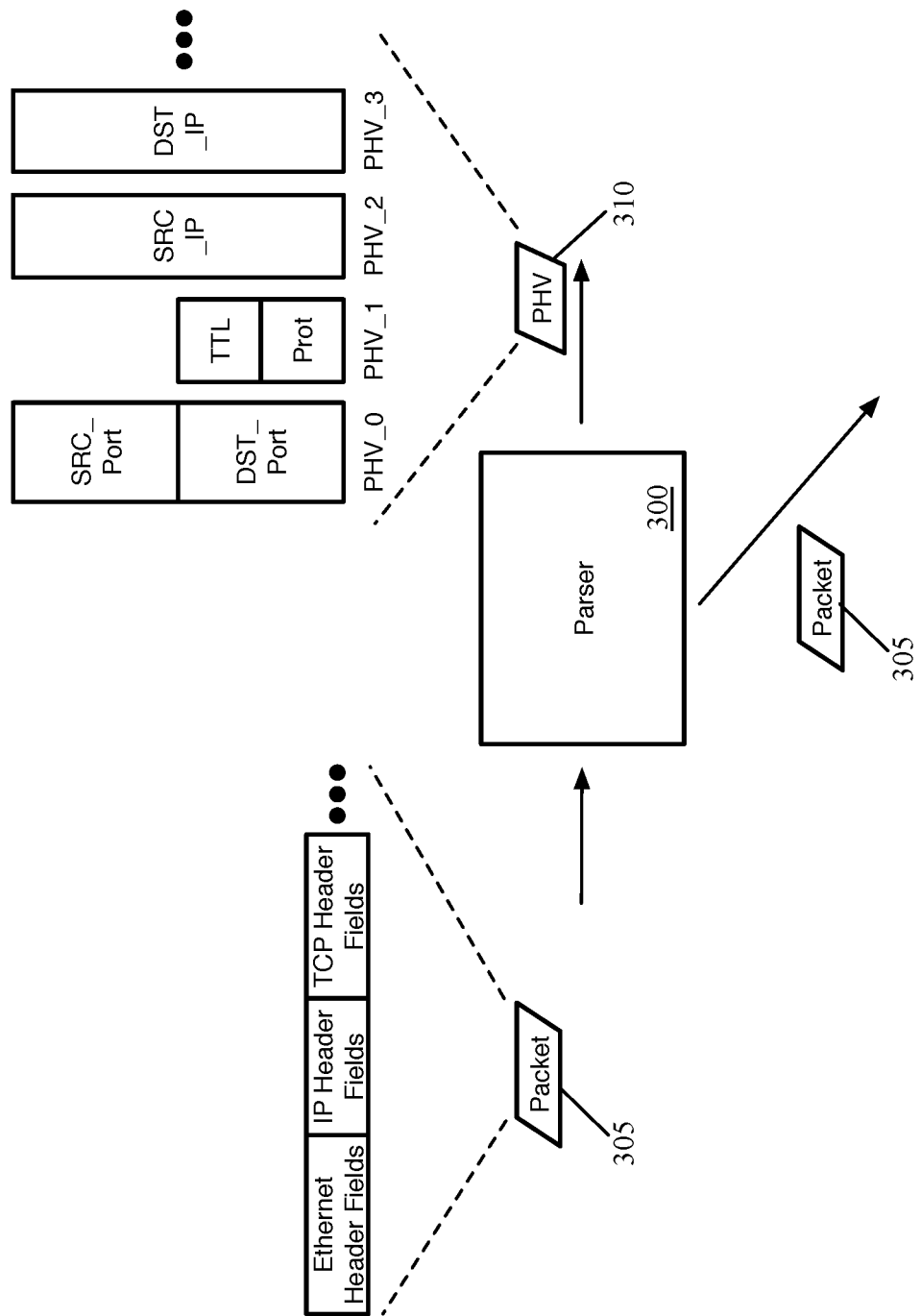
FIG. 3 conceptually illustrates a parser of some embodiments with its inputs and outputs.

FIG. 3 conceptually illustrates a parser 300 of some embodiments with its inputs and outputs in more detail. In some embodiments, the parser 300 receives a packet 305 as an ordered set of data. As shown, the packet 305 includes packet header fields for various protocols, which may be commonly known protocol headers (as in the example of the packet 305), proprietary protocol headers, etc. In this example, as shown, the packet includes Ethernet header fields (e.g., source and destination MAC addresses, an Ethertype, etc.), Internet Protocol (IP) header fields (e.g., source and destination IP addresses, a time to live, a protocol, etc.), Transport Control Protocol (TCP) header fields (e.g., source and destination ports, etc.), as well as additional fields for higher level protocols (e.g., application layer protocols).

Based on its own instructions and analysis of the packet, the parser 305 identifies packet header fields of the packet and stores the packet header field values in the set of data containers, collectively referred to as a packet header vector (PHV) 310. In some embodiments, the parser 300 includes a parse graph state machine that iteratively identifies the next protocol and uses instructions for that protocol to parse its packet header fields and store the fields in the PHV data containers. In some embodiments, for all except the first protocol (which may be, e.g., constant for all traffic processed by the forwarding element), the next protocol is identified based on a field of the preceding protocol header (e.g., the Ethernet's Ethertype field, the IP Protocol field, etc.). The parser 300 performs this parsing up to an exit point (e.g., the layer 4 header, etc.), with the remaining bits of the packet considered the payload. This payload portion is not stored in the PHV, so that the entire packet does not need to be replicated through the match-action unit.

The data containers of the PHV 310 are differentiated using, e.g., identifiers, and the parser stores specific bits of each packet header field in constant, identifiable locations within the PHV. Each data container may be the same size in some embodiments, while in other embodiments, different containers may have different sizes (e.g., 8 bits, 16 bits, 32 bits, etc.). In the example of FIG. 3, the PHV includes at least the four data containers shown. These include a 32-bit container storing the source and destination transport layer port numbers (PHV_0), a 16-bit container storing the time to live and protocol IP header fields (PHV_1), and two 32-bit containers storing the source and destination IP addresses (PHV_2 and PHV_3, respectively). The parser provides this PHV to the match-action unit, which matches on these values and performs actions that may include modifying one or more of the packet header field values stored in the PHV. The parser also, as shown, outputs the packet 305 (other embodiments only output the payload portion) via a separate connection within the forwarding element. This connection provides the complete formatted packet data to the deparser, for recombination with the PHV as modified after MAU processing.

Figure 4:
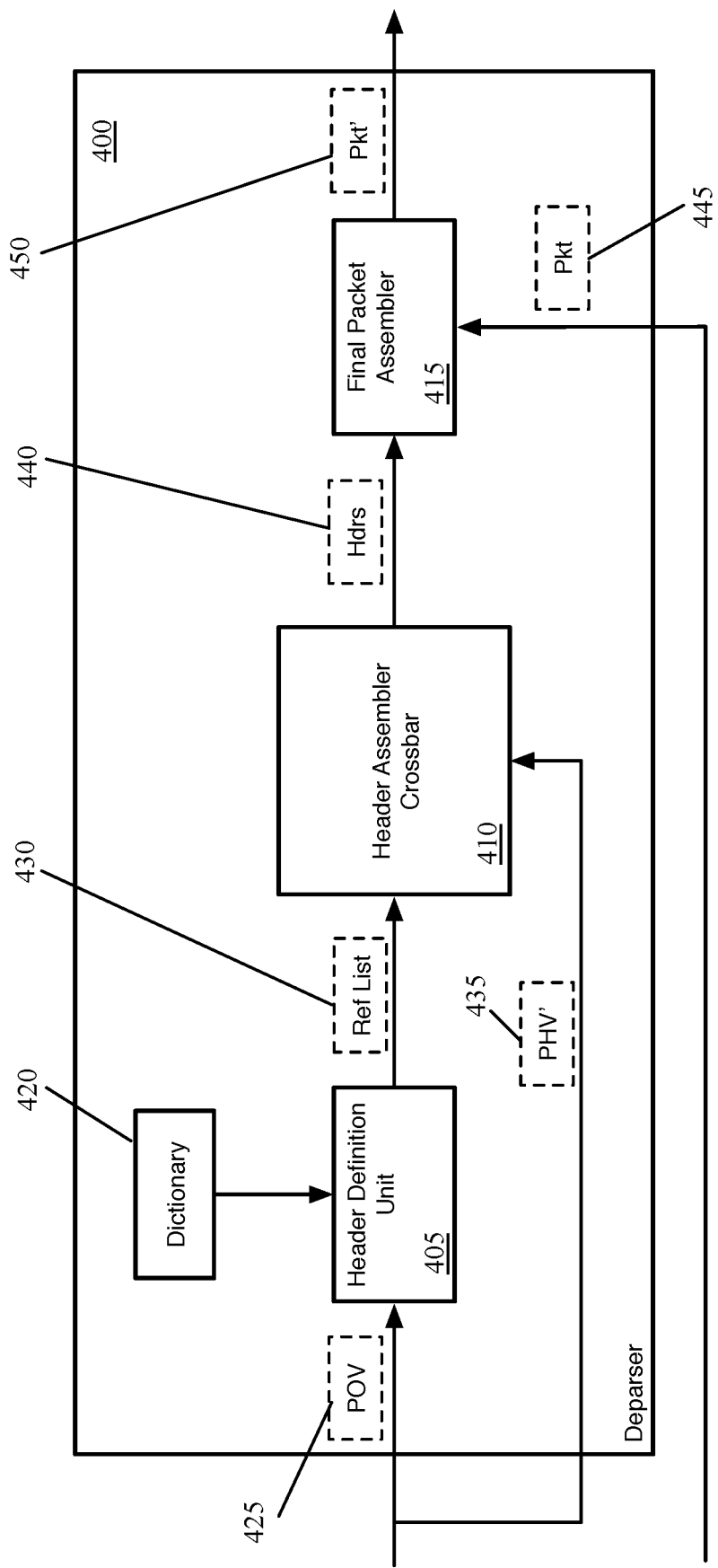
FIG. 4 conceptually illustrates the architecture of a deparser of some embodiments.
Figure 5:
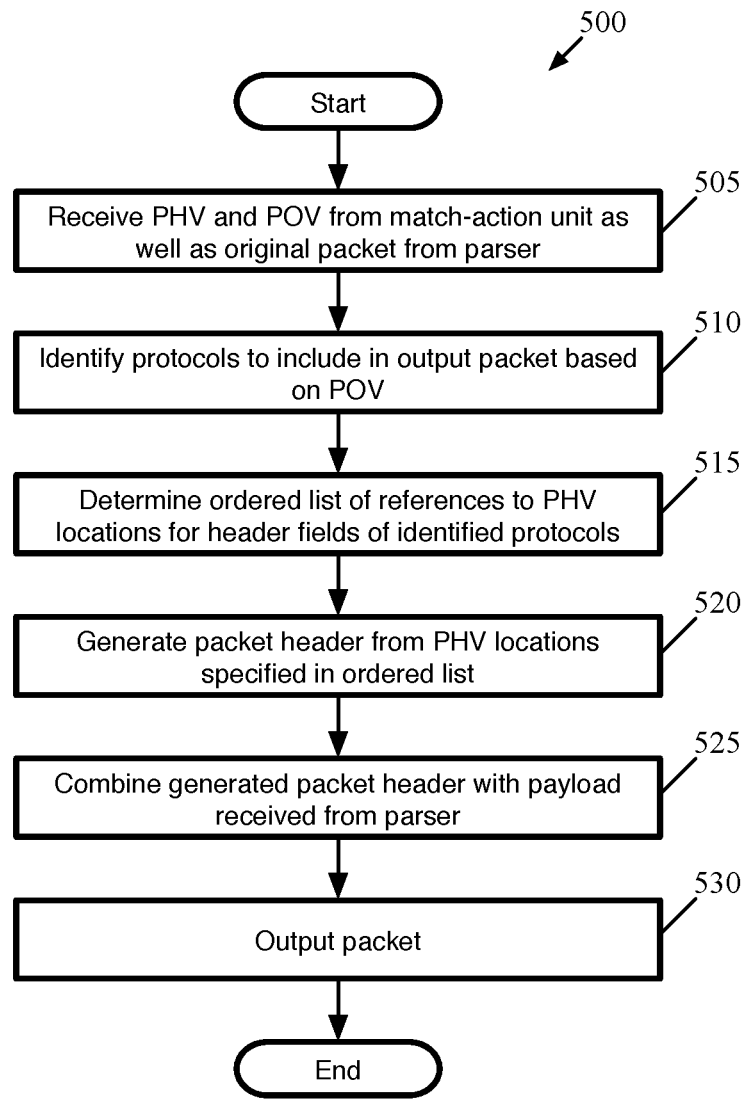
FIG. 5 conceptually illustrates a process of some embodiments for constructing a packet at the deparser.

FIG. 4 conceptually illustrates the architecture of a deparser 400 of some embodiments. As shown, the deparser 400 includes a header definition unit 405, a header assembler crossbar 410, and a final packet assembler 415. In addition, the deparser 400 stores the dictionary 420 as a static data object. The deparser 400 will be described in part by reference to FIG. 5, which conceptually illustrates a process 500 of some embodiments for constructing a packet at the deparser.

As shown, the process 500 begins by receiving (at 505) a packet header vector (PHV) and a packet occupancy vector (POV) from the match-action unit as well as the original packet from the parser. In some embodiments, the forwarding element is configured in such a way that the data is received from the MAU and the parser on the same clock cycle. In other embodiments, the data arrives to the parser at different times and other mechanisms are used to synchronize the sets of data for a single packet. In some embodiments, the POV is not received as data separate from the PHV, but instead the deparser extracts the POV from known locations within the PHV.

The process 500 then identifies (at 510) the protocols to include in an output packet based on the POV, and determines (at 515) an ordered list of references to PHV locations for the header fields of the identified protocols. As shown in FIG. 4, the header definition unit 405 takes the POV 425 and dictionary 420 as input and outputs a list of references to data containers 430.

Figure 6:
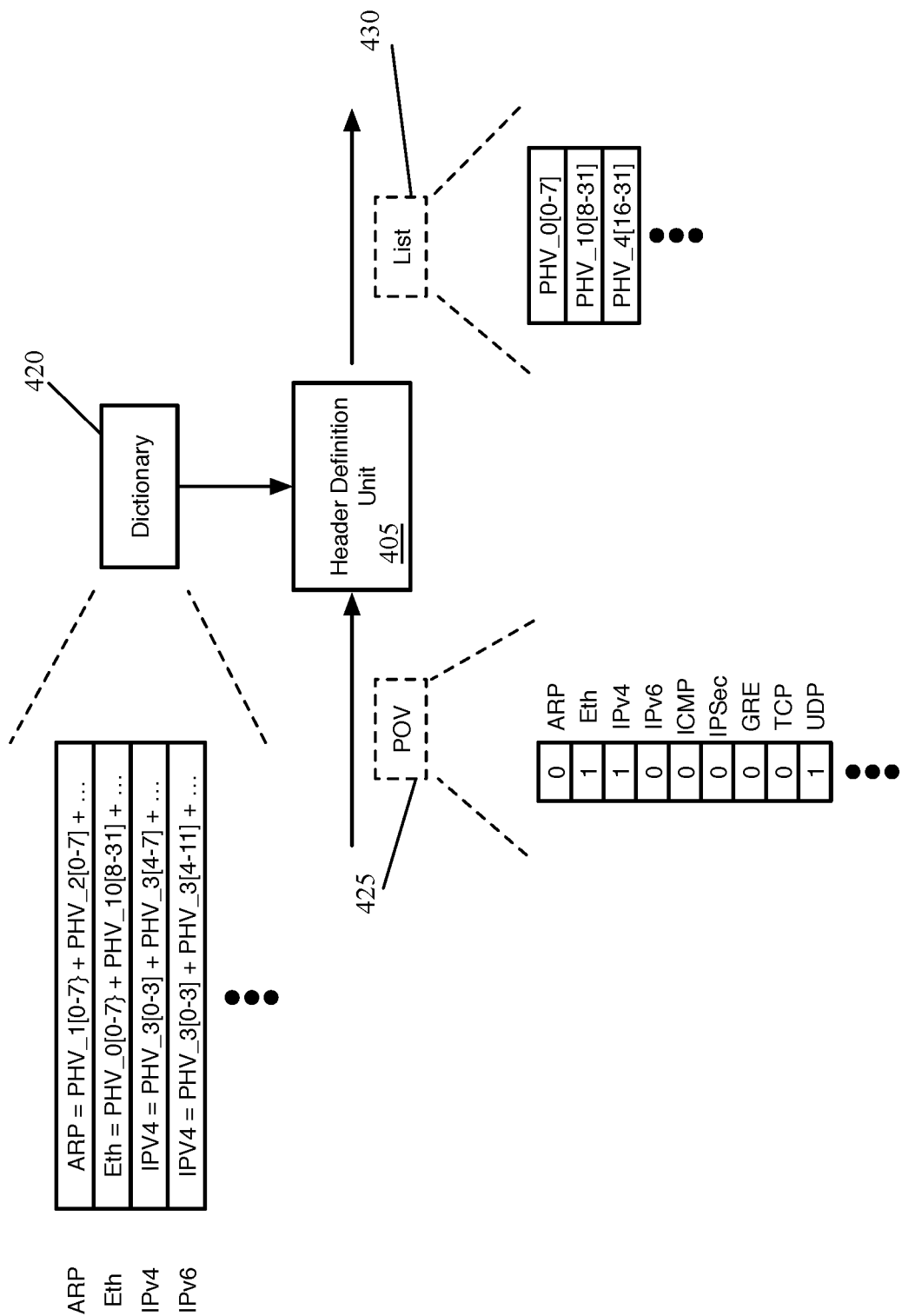
FIG. 6 conceptually illustrates the operation of the header definition unit of the deparser.

FIG. 6 conceptually illustrates this operation of the header definition unit 405 in more detail. Specifically, FIG. 6 shows examples of the structure of the dictionary 420, POV 425, and output reference list 430. The dictionary 420 (also referred to as a field dictionary), in some embodiments, is a list of data container identifiers for the packet header fields of all possible protocols (e.g., Ethernet, IP, TCP, UDP, GRE, ARP, proprietary protocols, etc.) that could be included in a packet processed by the forwarding element. This list identifies, for each bit (or each byte) of a protocol's packet header, the location within the PHV for that specific bits. In some embodiments, the dictionary 420 specifies this information in terms of a data container identifier and a bit range within that data container. As the example shows, for, e.g., the IPv4 protocol, the first header field (the version) can be found in the first four bits of the data container PHV_3, the second header field (the header length) can be found at the next four bits of PHV_3, etc. For IPv6, the version field is at the same location (the first four bits of PHV_3), while the next header field (the traffic class) is found at the next eight bits of PHV_3. Thus, different protocols may use the same PHV locations, so long as those protocols are mutually exclusive (i.e., a packet will either have an IPv4 header or an IPv6 header, but not both. The dictionary 420 of some embodiments lists similar instructions for each possible protocol that could be included in a packet processed by the forwarding element pipeline.

The POV 425 is a set of data that indicates which packet header fields to include in the constructed packet. In some embodiments, this is a list of the protocols to include in the packet and an order for these protocols within the packet header. In some embodiments, as shown in FIG. 6, the POV is an array of bits that indicates which protocols are "turned on" for the packet. For instance, in the example packet, the Ethernet, IPv4, and UDP protocols will be used in the packet header construction, while the ARP, IPv6, ICMP, TCP, etc.

protocols are not. Some embodiments provide additional information that specifies the order, while in other embodiments the deparser determines the order based on standard protocol ordering.

The header definition unit 405 uses the POV indication of which protocols to include and combines this with the dictionary 420 to specify the ordered list of references to PHV data container locations 430 that the subsequent deparser units use to construct the packet headers. This list, as shown in the figure, provides PHV locations for each packet header field of the eventual constructed packet. In this example, the packet begins with the Ethernet header, and thus the list 430 begins with the references to the data container locations for this header (the first 8 bits of PHV_0, bits the last 24 bits of PHV_10, etc.). The list 430 includes similar references for each packet header field for each protocol specified by the POV 425.

Returning to FIG. 5, the process 500 next generates (at 520) the packet header from the PHV locations specified in the ordered list. The deparser 400 of some embodiments includes an assembler crossbar 410 that takes as inputs (i) the data containers of the PHV 435 (i.e., the modified PHV from the match-action unit) and (ii) the ordered list of PHV data container references 430 and outputs the packet headers 440 for the constructed packet. That is, the crossbar 410 maps the bits stored in the PHV containers 435 to the references stored in the list 430, and constructs the packet headers from these bits (in the order specified by the list 430).

The process 500 then combines (at 525) the generated packet headers with the payload received directly from the parser, and outputs (at 530) this packet. As shown in FIG. 4, the final packet assembler 415 combines the packet header constructed by the header assembler crossbar 410 with the packet 445 received from the parser (outside the MAU) to generate a modified packet 450. In some embodiments, the final packet assembler 415 knows the number of bits from the start of the packet 445 at which the payload begins. The packet assembler 415 extracts this payload and appends it to the headers 440 to generate the modified packet 450. In addition, in some embodiments, the final packet assembler performs additional operations, such as computing the IP checksum, Ethernet cyclic redundancy check, etc., and inserting these into the packet.

If the processing pipeline 400 is an ingress pipeline (i.e., processing packets received at an ingress port of the forwarding element, the deparser of some embodiments outputs the constructed packet 450 to a traffic manager that enqueues the packet for output via a particular port of the forwarding element. If the processing pipeline is an egress pipeline (i.e., processing packets from the traffic manager for output via a particular port of the forwarding element), the deparser of some embodiments sends the constructed packet 450 out of the forwarding element via this port.

In the above description, the parser stores all packet header fields up to a determined point (e.g., the end of a particular protocol header) in the PHV containers, even if some of those fields (or, possibly, entire protocol headers) will not be used by the match-action stages of the pipeline. Some embodiments, however, enable the parser to only store in the PHV data containers the packet header field values that may be required by the match-action stages. For the other packet header fields, the parser generates and sends descriptive data directly to the deparser (along with the packet data). This descriptive data identifies the locations in the packet data at which the packet header field values not included in the PHV can be found. The parser generates the descriptive data for each packet header field (or contiguous block of packet header fields) not included in the PHV, and the deparser uses this descriptive data to identify the location in the packet data of the packet header field values to use in constructing the packet.

Figure 7:
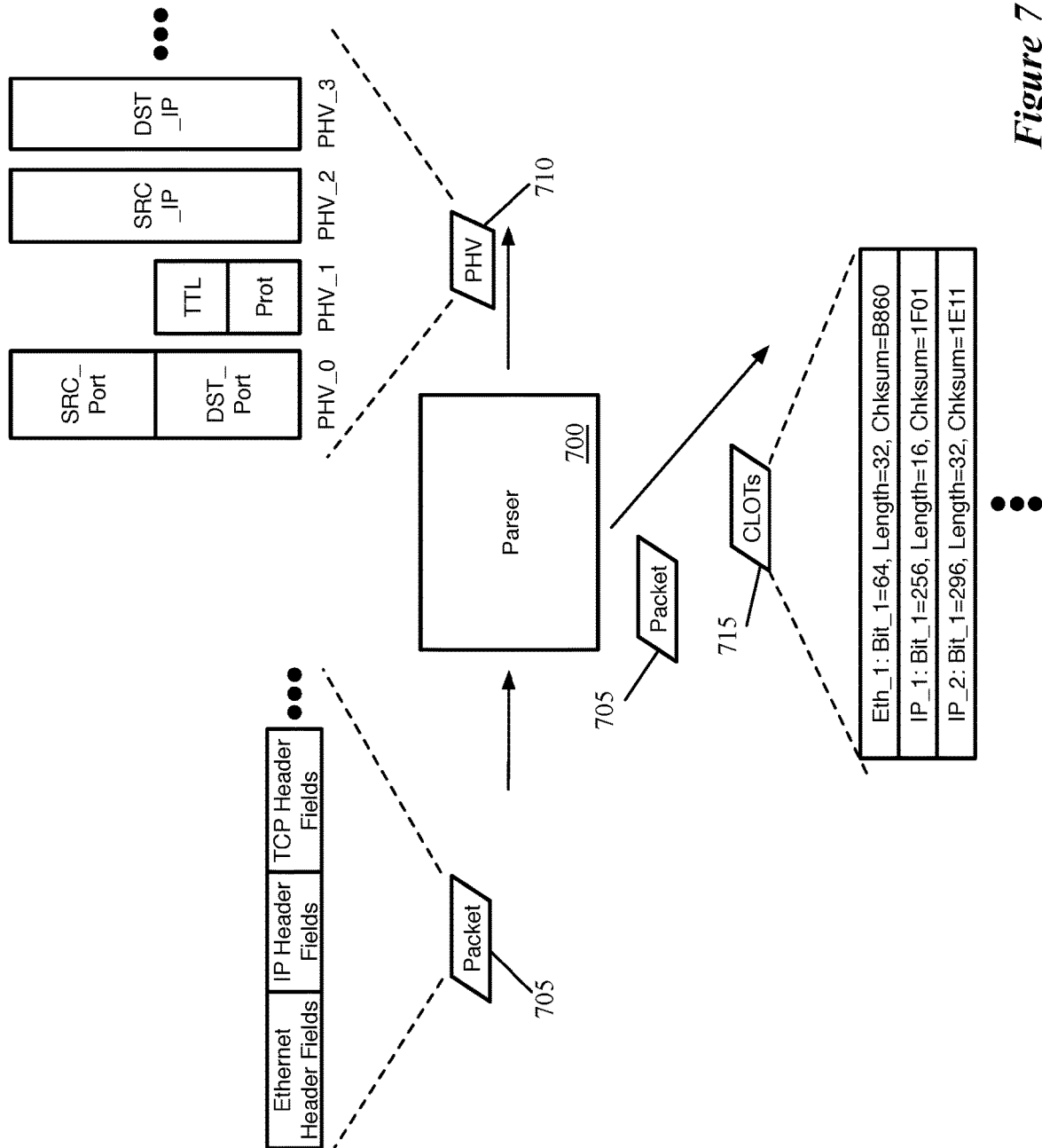
FIG. 7 conceptually illustrates a parser of some embodiments that generates such descriptive data for packet header fields not included in the PHV.
Figure 8:
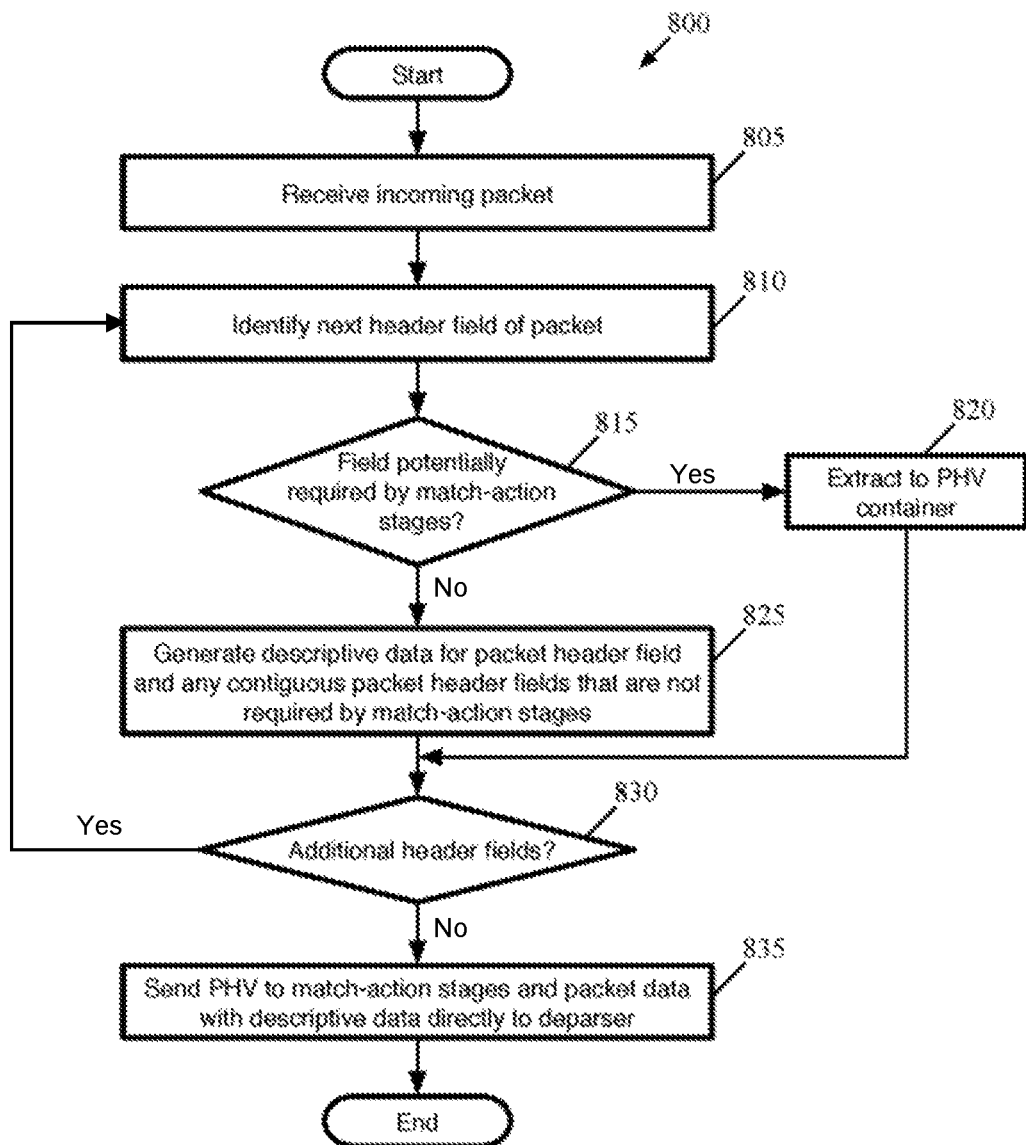
FIG. 8 conceptually illustrates a process of some embodiments for extracting potentially required packet header fields into a PHV for the match-action unit while generating descriptive data for other packet header fields.

FIG. 7 conceptually illustrates a parser 700 of some embodiments that generates such descriptive data for packet header fields not included in the PHV. The operations of the parser 700 will be described in further detail by reference to FIG. 8, which conceptually illustrates a process 800 of some embodiments for extracting potentially required packet header fields into a PHV for the match-action unit while generating descriptive data for other packet header fields.

As shown, the process 800 begins by receiving (at 805) an incoming packet. This packet may be incoming from an ingress port, or from the traffic manager, depending on whether the parser is part of an ingress or egress pipeline. The packet is received as an ordered set of data that includes packet header fields for various protocols, which may be commonly known protocol headers (as in the example of the packet 705), proprietary protocol headers, etc. In the example of FIG. 7, as shown, the packet 705 includes Ethernet header fields (e.g., source and destination MAC addresses, an Ethertype, etc.), Internet Protocol (IP) header fields (e.g., source and destination IP addresses, a time to live, a protocol, etc.), Transport Control Protocol (TCP) header fields (e.g., source and destination ports, etc.), as well as additional fields for higher level protocols (e.g., application layer protocols).

The process 800 then identifies (at 810) the next header field of the packet. Initially, this will be the first header field, starting from the beginning of the packet (i.e., the outermost packet header). The process 800 determines (at 815) whether the field is potentially required by the match-action stages. In some embodiments, any packet header field that either (i) could be evaluated by any of the match-action stages or (ii) could be modified by any of the match-action stages falls into the category of being potentially required by the match-action stages. Because the value of one packet header field may affect what fields are evaluated or modified in subsequent stages, packet headers may be potentially required by the match-action unit but not actually evaluated or modified for some packets.

If the field is potentially required by the match-action stages, the process extracts (at 820) the value of that packet header field and stores that packet header field value in a PHV container. The data containers of the PHV 710 are differentiated using, e.g., identifiers, and the parser stores specific bits of each packet header field in constant, identifiable locations within the PHV. Each data container may be the same size in some embodiments, while in other embodiments, different containers may have different sizes (e.g., 8 bits, 16 bits, 32 bits, etc.). In the example of FIG. 3, the PHV includes at least the four data containers shown. These include a 32-bit container storing the source and destination transport layer port numbers (PHV_0), a 16-bit container storing the time to live and protocol IP header fields (PHV_1), and two 32-bit containers storing the source and destination IP addresses (PHV_2 and PHV_3, respectively).

On the other hand, if the field is definitely not required by the match-action stages, the process generates (at 825) descriptive data for the packet header field and any contiguous packet header fields that are not required by the match-action stages. That is, a single descriptive data item may be generated for multiple contiguous packet header fields in some embodiments, if all of those packet header fields are not required by the match-action stages. Unlike the PHV data containers of some embodiments, the descriptive data items do not have a maximum size (or, at least, a maximum size that is likely to be reached). For instance, in an IPv4 header, if the match-action stages do not require any of the version, IHL, DSCP, and ECN fields (the first four fields of the protocol header), some embodiments provide a single piece of descriptive data for this block of packet data, rather than four separate descriptions for each separate field.

In some embodiments, the descriptive data generated by the parser for a particular portion of the packet data provides a starting location (e.g., a starting bit location) in the packet data and a length for the particular portion that is not included in the PHV. In addition, some embodiments include a tag that identifies the particular descriptive data item and thereby specifies the packet header field or fields included in the referenced portion of the packet data. The parser is configured to always tag the same packet header field or set of packet header fields with the same tag, so that the deparser can use the tag to identify the descriptive data (and thus the location of the packet header field within the packet data). In addition, some embodiments also include checksum data for at least a subset of the packet data portions with the descriptive data for these packet data portions. This allows the deparser to easily include this checksum data in the protocol header (e.g., for Internet Protocol header data portions). Many protocols (e.g., IP) compute checksums in a piecemeal manner, and thus the checksum for a particular portion can be determined independently of the portions in the PHV. These descriptive data items may in some embodiments be referred to as CLOTs (Checksum/Length/Offset/Tag).

FIG. 7 illustrates an example of several of these CLOTs 715 that are generated by the parser 700. As shown, each CLOT includes a tag (Eth_1, IP_1, IP_2), a starting bit, a length, and a checksum. The starting bit identifies the first bit in the packet data for the first packet header field referenced by the CLOT tag. This value starts at 0, and increases throughout the packet (i.e., the Ethernet CLOTs will have an earlier starting bit than the IP CLOTs). The length identifies the number of bits that are included in the CLOT, typically up to the beginning of the next packet header field that is stored in the PHV. For instance, the IP_2 CLOT in FIG. 7 has a 32-bit length (e.g., for the ID, flags, and fragment offset fields of the IP header). Lastly, each CLOT includes a checksum contribution. These are shown as four bytes in this case, but in some embodiments these checksums may be of varying length. In some embodiments, the number of CLOTs is limited (i.e., the hardware can only be configured to pass a particular number of CLOTs for a given packet). For instance, some embodiments limit the number of CLOTs (or similar descriptive data items) to 16, 32, etc.

After either adding the packet header field to the PHV or generating descriptive data for one or more packet header fields, the process 800 determines (at 830) whether additional header fields remain to be parsed. In some embodiments, as described above, the parser 700 includes a parse graph state machine that iteratively identifies the next protocol and uses instructions for that protocol to parse its packet header fields. This parse graph, in some embodiments, also specifies for each packet header field whether that packet header field should be added to the PHV or whether the parser should generate descriptive data to send directly to the deparser. That is, in some embodiments, the parser does not actually evaluate a decision as to whether the field is potentially required by the match-action unit, but instead follows the parse graph instructions as to whether to store the field in a PHV container or not. In some embodiments, for all except the first protocol (which may be, e.g., constant for all traffic processed by the forwarding element), the next protocol is identified based on a field of the preceding protocol header (e.g., the Ethernet's Ethertype field, the IP Protocol field, etc.).

The parser 700 performs this parsing up to an exit point (e.g., the layer 4 header, etc.), with the remaining bits of the packet considered the payload. At this exit point, the process does not return to 810. If, on the other hand, additional packet header fields remain, the process returns to 810 to identify the next packet header field. This next field is the field after the packet header field most recently added to the PHV container, or after the most recent contiguous block of packet header fields for which descriptive data (i.e., a CLOT) was generated.

Once the parser has reached its exit point of the packet (i.e., the portion of the packet considered to be part of the header for the forwarding element has been parsed, and the remaining packet data is considered to be payload), the process sends (at 835) the PHV data containers to the match-action unit (i.e., to the first match-action stage) and sends the packet data and the descriptive data (the CLOTs) directly to the deparser. The PHV is provided to the match-action unit, which matches on these values and performs actions that may include modifying one or more of the packet header field values stored in the PHV, as described above. The parser also, as shown, outputs the packet 705 and the CLOTs 715 via a separate connection within the forwarding element.

The use of this descriptive data enables substantial size savings in the PHV. Without this descriptive data, as described above, all of the packet header fields up to the end of the last desired protocol header are put into the PHV containers, even if those header fields are not needed by the match-action stages (as the packet data sent directly to the parser is used only for the payload). Using this descriptive data, however, means that the packet header fields not required by the match-action stages need not be duplicated into the PHV containers.

Some embodiments, additionally, generate the descriptive data (e.g., CLOTs) for some packet header fields that are also stored in the PHV. This allows the MAU to drop certain data containers between match-action stages once the packet header fields stored in the data containers are no longer needed, so long as the parser has also sent to the deparser a description of how to find those packet header fields in the original packet data. In order for the MAU to drop a particular data container of the PHV, some embodiments require that (i) none of the packet header field values stored in the data container will be evaluated or modified in any subsequent match-action stages and (ii) that the packet header field values have not previously been modified by an earlier match-action stage. As an example, for a pipeline that performs routing based on source and/or destination IP addresses, but does not modify these IP addresses (e.g., no network address translation is performed), once the routing stage has been passed, the MAU can drop the PHV container(s) for the IP addresses. This provides additional savings in that the amount of data that needs to be passed to later match-action stages can be reduced.

When the deparser receives (i) the PHV from the last match-action stage (along with the indicator as to which protocols to include in the constructed packet) and (ii) the packet data and descriptive data via the direct connection from the parser, the deparser uses all of this data to construct the eventual packet. The deparser, as described above, generates an ordered list of references for constructing the packet header. In this case, the ordered list includes both references to PHV locations (as described above) as well as references to locations within the packet data received from the parser. These references to packet data locations are generated by the parser using the descriptive data from the parser, which is identified by a tag that specifies the packet header field(s) to which the descriptive data refers. Thus, for example, the ordered list might refer to a location within a first PHV container for a first packet header field, then to a location within the packet data for a second packet header field (or set of fields), and then to a location within a second PHV container for a third packet header field.

Figure 9:
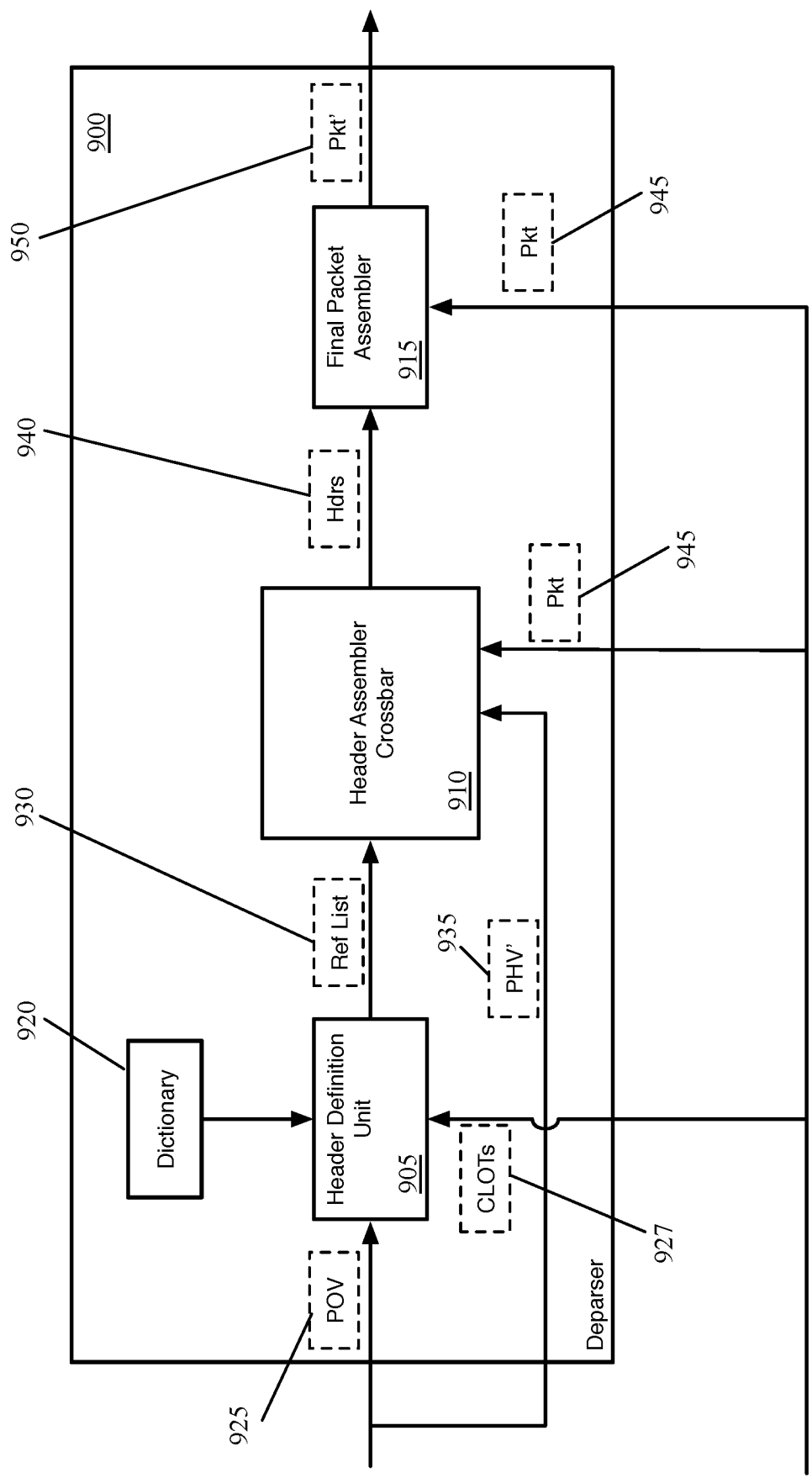
FIG. 9 conceptually illustrates the architecture of a deparser of some embodiments, for a processing pipeline that uses CLOTs (or other forms of descriptive data) to avoid sending the entire packet header through the match-action stages.
Figure 10:
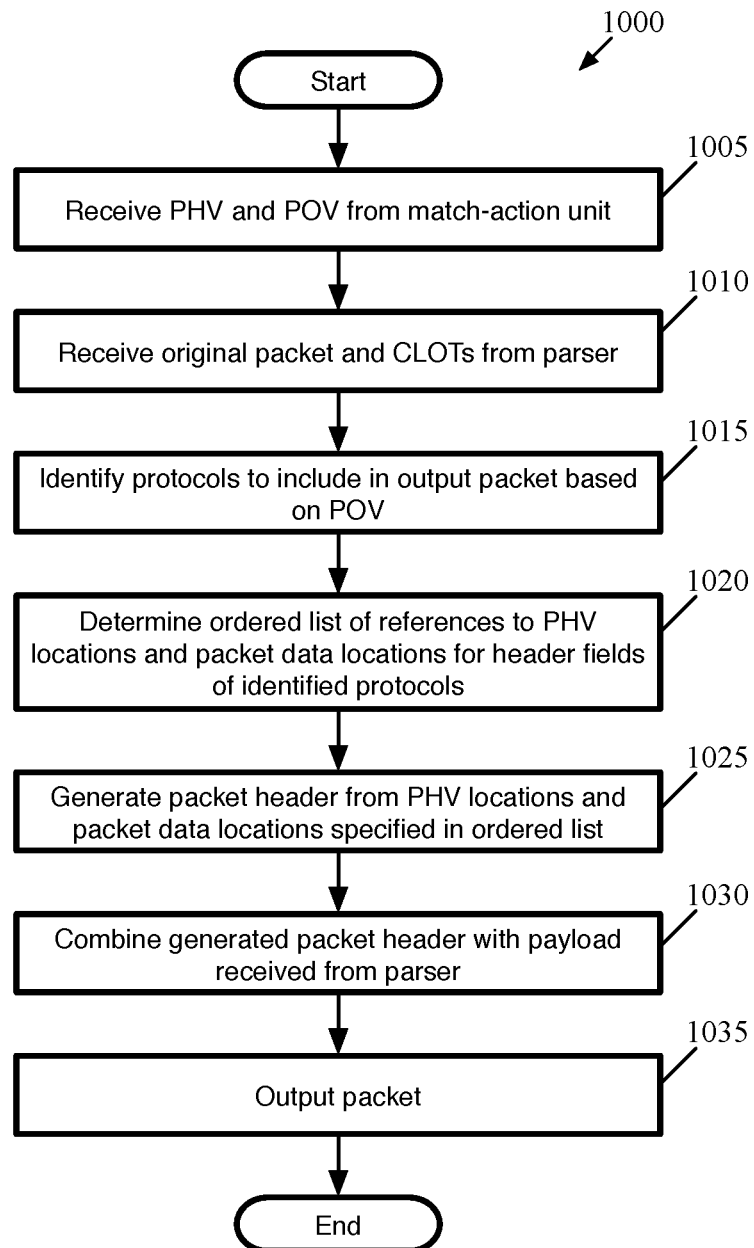
FIG. 10 conceptually illustrates a process of some embodiments for constructing a packet at the deparser when CLOTs are used.

FIG. 9 conceptually illustrates the architecture of a deparser 900 of some embodiments, for a processing pipeline that uses CLOTs (or other forms of descriptive data) to avoid sending the entire packet header through the match-action stages. As shown, the deparser 900 includes a header definition unit 905, a header assembler crossbar 910, and a final packet assembler 915. In addition, the deparser 900 stores a dictionary 920 as a static data object. These different units are similar to the corresponding units of the deparser 400, but also incorporate the CLOTs into their deparser functionality. The deparser 900 will be described in part by reference to FIG. 10, which conceptually illustrates a process 1000 of some embodiments for constructing a packet at the deparser when CLOTs are used.

As shown, the process 1000 begins by receiving (at 1005) a packet header vector (PHV) and a packet occupancy vector (POV) from the match-action unit. The process also receives (at 1010) the original packet and a set of descriptive data (e.g., CLOTs) from the parser. In some embodiments, the forwarding element is configured such that the data is received from the MAU and the parser on the same clock cycle. In other embodiments, the data arrives to the parser at different times and other mechanisms are used to synchronize the various pieces of data used by the deparser to construct a single packet.

The process 1000 then identifies (at 1015) the protocols to include in an output packet based on the POV, and determines (at 1020) an ordered list of references to PHV locations for the header fields of the identified protocols. As shown in FIG. 9, the header definition unit 905 takes the POV 925, CLOTs 927, and dictionary 920 as input, and outputs a list of references 930. As shown, the POV 925 is received from the same source (i.e., the last match-action stage) as that of the modified PHV 935, while the CLOTs 927 are received from the same source (i.e., the parser) as the original packet data 945.

Figure 11:
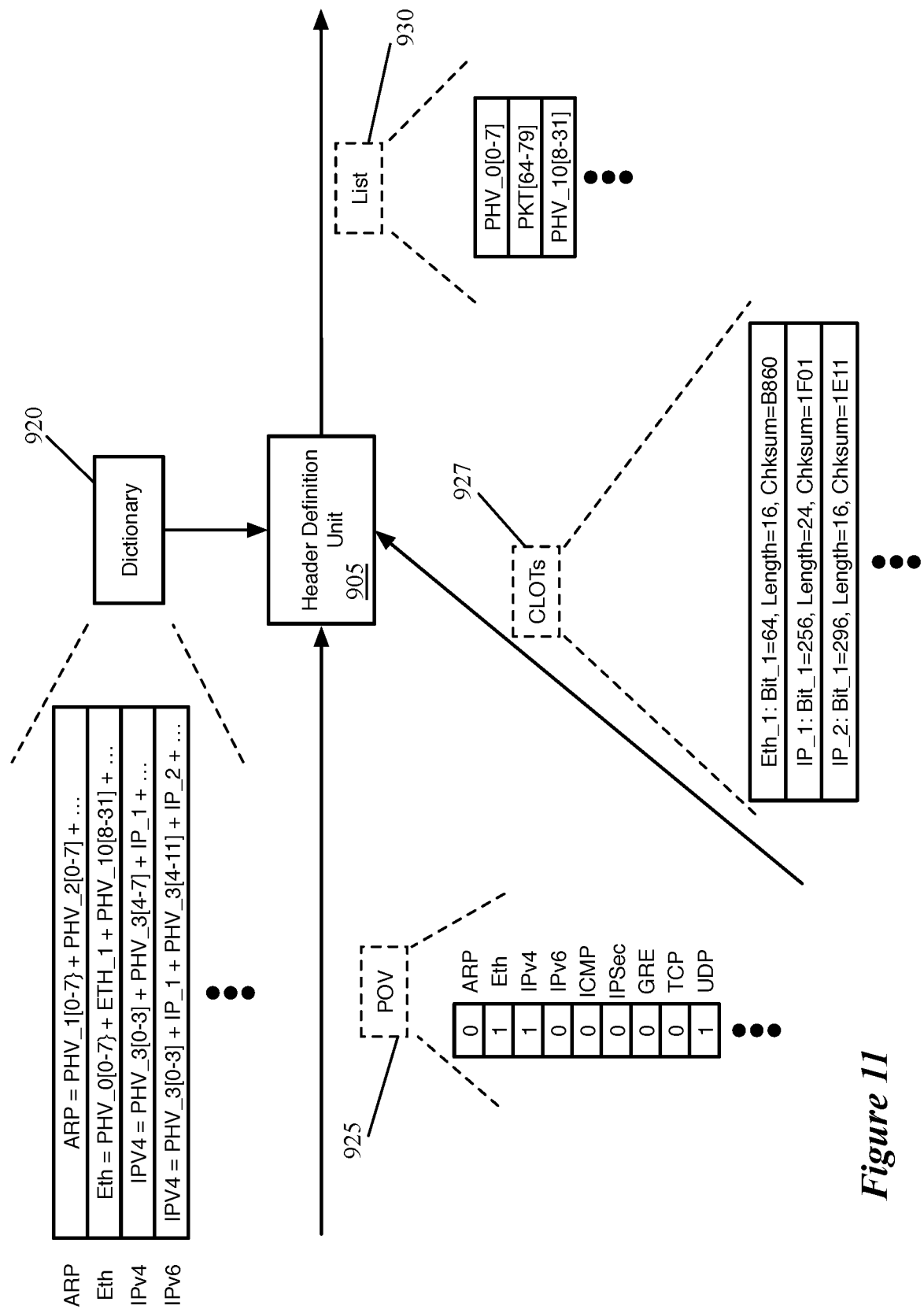
FIG. 11 conceptually illustrates the operation of the header definition unit of the deparser of FIG. 9.

FIG. 11 conceptually illustrates this operation of the header definition unit 905 in more detail. Specifically, FIG. 11 shows examples of the structure of the dictionary 920, POV 925, CLOTs 927, and output reference list 930. While similar to that shown in FIG. 6, the dictionary 920 and output reference list 930 are different in embodiments in which CLOTs (or other descriptive data) are used, as the dictionary incorporates the CLOT tags into its packet header field locations and the output reference list includes references to packet data from the CLOTs.

The dictionary 1120, in some embodiments, is a list of identifiers for locations of the packet header fields of all possible protocols (e.g., Ethernet, IP, TCP, UDP, GRE, ARP, proprietary protocols, etc.) that could be included in a packet processed by the forwarding element. In the case of a pipeline that uses CLOTs, this list identifies, for each bit (or each byte) of a protocol's packet header, either (i) the location within the PHV or (ii) the tag of a CLOT that specifies the packet location for that specific bit. In some embodiments, the dictionary 1120 specifies the PHV location information in terms of a data container identifier and a bit range within that data container. For packet data, the dictionary 1120 of some embodiments specifies a CLOT tag, which in turn identifies a location within the packet data.

As the example shows, the dictionary 1120 specifies data for each possible protocol. For a given protocol, this data may be a combination of PHV container locations and CLOT tags. For instance, the Ethernet header uses bits 0-7 of the PHV_0 data container, then uses the bits of packet data referenced by the CLOT ETH_1 (which will always reference the same packet header fields for any Ethernet packet with an Ethernet header, but may reference different bit locations of the packet data depending on various factors about the packet itself), then bits 8-31 of the PHV_10 data container. As with the PHV data containers, two mutually exclusive protocols (e.g., IPv4 and IPv6) can reference the same CLOT tag; depending on whether a packet is an IPv4 packet or an IPv6 packet, the parser will define the CLOT to reference the appropriate data.

As described above by reference to FIG. 6, the POV 925 is a set of data that indicates which packet header fields to include in the constructed packet. In some embodiments, this is a list of the protocols to include in the packet and an order for these protocols within the packet header. As shown in FIG. 11, the POV of some embodiments is an array of bits that indicates which protocols are "turned on" for the packet. For instance, in the example packet, the Ethernet, IPv4, and UDP protocols will be used in the packet header construction, while the ARP, IPv6, ICMP, TCP, etc. protocols are not. Some embodiments provide additional information that specifies the protocol order, while in other embodiments the deparser determines the order based on standard protocol ordering.

As described, the header definition unit 905 uses the POV indication of which protocols to include and combines this with the dictionary 920 to specify the ordered list of references 930, to both PHV data container locations and to packet data locations (based on the CLOT information), which the subsequent deparser units use to construct the packet headers. This list, as shown in the figure, provides the data locations for each packet header field of the eventual constructed packet. In this example, the packet begins with the Ethernet header, and thus the list 930 starts with a reference to the PHV_0 data container (the first 8 bits of this data container), then references the packet data (bits 64-79), and then the PHV_10 data container (bits 8-31). To generate the packet data reference, the header definition unit reads the CLOT tag ETH_1 from the dictionary 920, and identifies the packet data bits referenced by the CLOT with the matching tag. In this case, the CLOT ETH_1 starts at bit 64 and is 16 bits long, so that it references bits 64-79. The list 930 includes similar references for each packet header field for each protocol specified by the POV 925.

Returning to FIG. 10, the process 1000 next generates (at 1025) the packet header from the PHV and packet data locations specified in the ordered list. The deparser 900 of some embodiments includes an assembler crossbar 910 that takes as inputs (i) the data containers of the PHV 935 (i.e., the modified PHV from the match-action unit), (ii) the packet data 945 sent directly from the parser, and (iii) the ordered list of references to data locations 930, and outputs the packet headers 940 for the constructed packet. That is, the crossbar 910 maps the bits stored in the PHV containers 935 and the original packet data 945 to the references stored in the list 930, and constructs the packet headers from these bits (in the order specified by the list 930). Some embodiments use a first crossbar for mapping the PHV data to header locations and a second crossbar for mapping the packet data to header locations. However, because the data from the two sources is interspersed (i.e., the header may contain data from a PHV container, then data from the original packet, then more data from the same or a different PHV container), some embodiments use a single crossbar in order to output the packet headers as an ordered stream of bits. This crossbar 910 of some embodiments treats the packet data similarly to a PHV data container (albeit a much larger one).

The process 1000 then combines (at 1030) the generated packet headers with the payload received directly from the parser, and outputs (at 1035) this packet. As shown in FIG. 9, the final packet assembler 915 combines the packet header constructed by the header assembler crossbar 910 with the packet 945 received from the parser (outside the MAU) to generate a modified packet 950. In some embodiments, the final packet assembler 915 knows the number of bits from the start of the packet 945 at which the payload begins. The packet assembler 915 extracts this payload and appends it to the headers 940 to generate the modified packet 950. In addition, in some embodiments, the final packet assembler performs additional operations, such as computing the IP checksum, Ethernet cyclic redundancy check, etc., and inserting these into the packet.

If the processing pipeline 900 is an ingress pipeline (i.e., processing packets received at an ingress port of the forwarding element, the deparser of some embodiments outputs the constructed packet 950 to a traffic manager that enqueues the packet for output via a particular port of the forwarding element. If the processing pipeline is an egress pipeline (i.e., processing packets from the traffic manager for output via a particular port of the forwarding element), the deparser of some embodiments sends the constructed packet 950 out of the forwarding element via this port.

Figure 12:
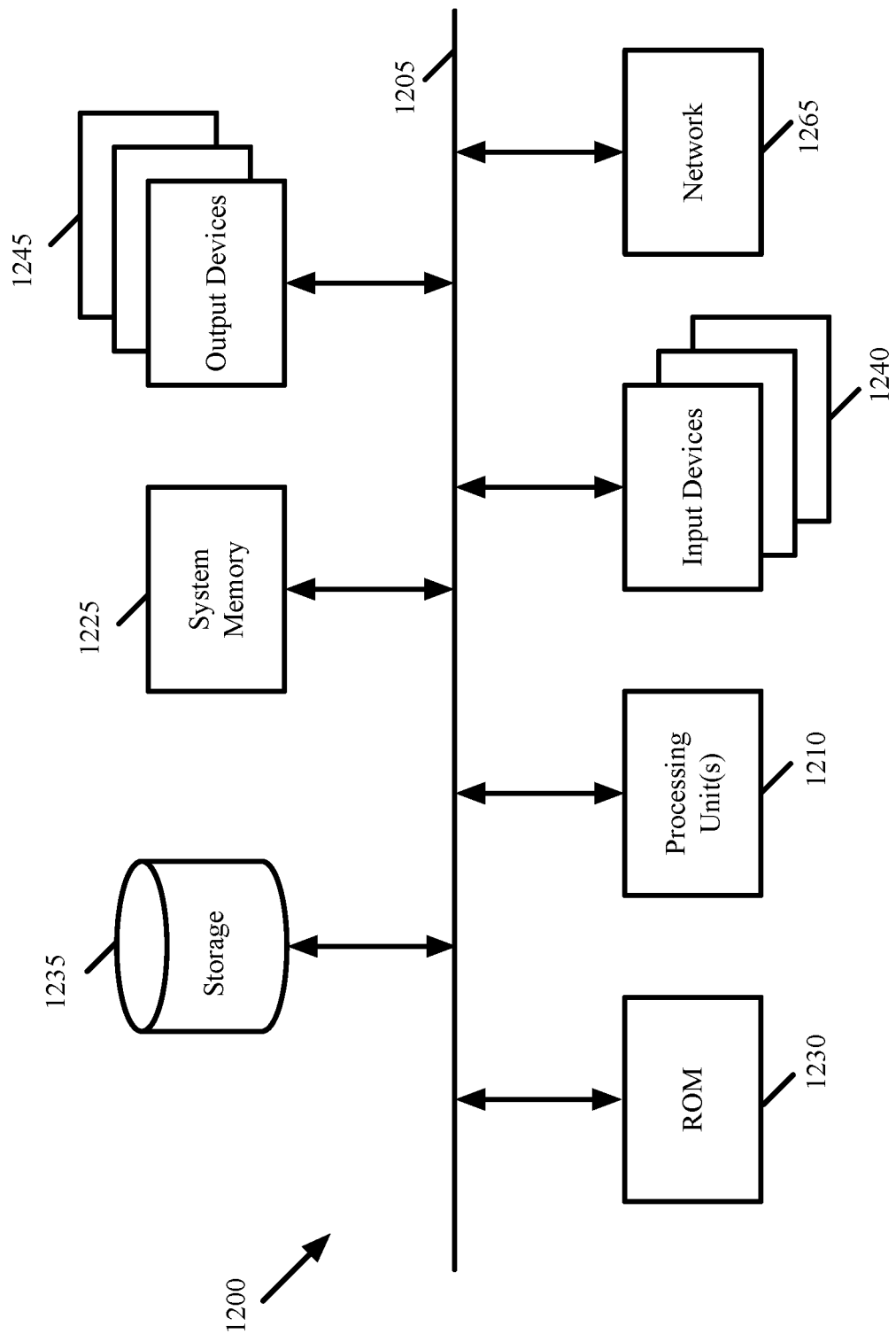
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 8, and 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. For a parser unit of a hardware forwarding element processing pipeline, a method comprising:
   receiving a packet for processing by a set of match-action stages of the processing pipeline;
   storing packet header field values from a first set of packet header fields of the packet in a set of data containers, the first set of packet header fields for use by the set of match-action stages;
   for a second set of packet header fields not used by the set of match-action stages, generating descriptive data that identifies locations of the second set of packet header fields within the packet; and
   sending (i) the set of data containers to the set of match-action stages and (ii) packet data and the generated descriptive data outside of the set of match-action stages to a deparser that uses the packet data, generated descriptive data, and the set of data containers as modified by the set of match-action stages to reconstruct a modified packet, wherein:
   the descriptive data generated for a particular packet header field comprises a starting location of the particular packet header field within the packet data and a length of the particular packet header field,
   the starting location is a particular bit location and the length is a particular number of bits, and
   the descriptive data for the particular packet header field further comprises checksum data for the particular packet header field.

2. The method of claim 1, wherein the hardware forwarding element processing pipeline comprises one of an ingress pipeline and an egress pipeline.

3. The method of claim 1, wherein the set of match-action stages comprises a plurality of configurable match-action stages that match over and modify the packet header field values stored in the set of data containers.

4. The method of claim 1, wherein the hardware forwarding element comprises a plurality of processing pipelines, wherein at least one of the processing pipelines comprises a parser, a set of match-action stages, and a deparser.

5. The method of claim 4, wherein the parser, set of match-action stages, and deparser are all configurable by an administrator.

6. The method of claim 1, wherein a particular packet header field of the second set of packet header fields is located in the packet prior to a first packet header field of the first set of packet header fields and after a second packet header field of the first set of packet header fields.

7. The method of claim 1, wherein a first packet header field of the first set of packet header fields and a second packet header field of the second set of packet header fields are part of a header for a same protocol.

8. The method of claim 1, wherein the descriptive data for the particular packet header field further comprises a tag identifying the particular packet header field.

9. The method of claim 1, wherein the descriptive data represents the second set of packet header fields without including an entirety of the second set of packet header fields.

10. A network forwarding integrated circuit comprising at least one packet processing pipeline, the packet processing pipeline comprising:
    a parser circuitry configured to:
       receive a packet for processing by a configurable match-action unit circuitry of the packet processing pipeline;
       store packet header field values from a first set of packet header fields of the packet in a set of data containers, the first set of packet header fields for use by the match-action unit circuitry;
       generate, for a second set of packet header fields not used by the match-action unit circuitry, descriptive data that is to identify locations of the second set of packet header fields second set within the packet; and
       provide (i) the set of data containers to the match-action unit circuitry and (ii) packet data and the generated descriptive data outside of the match-action unit circuitry to a deparser circuitry of the processing pipeline;
    the configurable match-action unit circuitry; and
    the deparser circuitry configured to use the packet data, generated descriptive data, and the set of data containers as modified by the match-action unit circuitry to reconstruct a modified packet, wherein:
    the descriptive data generated for a particular packet header field comprises a starting location of the particular packet header field within the packet data and a length of the particular packet header field,
    the starting location is a particular bit location and the length is a particular number of bits, and
    the descriptive data for the particular packet header field further comprises checksum data for the particular packet header field.

11. The network forwarding integrated circuit of claim 10, wherein the match-action unit circuitry comprises a plurality of configurable match-action stages configured to match over and modify the packet header field values stored in the set of data containers.

12. The network forwarding integrated circuit of claim 10 further comprising a plurality of processing pipelines, wherein at least one of the processing pipelines comprises a parser circuitry, a match-action unit circuitry, and a deparser circuitry.

13. The network forwarding integrated circuit of claim 10, wherein the parser circuitry, configurable match-action unit circuitry, and deparser circuitry are all configurable and programmable by an administrator.

14. The network forwarding integrated circuit of claim 10, wherein a particular packet header field of the second set of packet header fields is located in the packet prior to a first packet header field of the first set of packet header fields and after a second packet header field of the first set of packet header fields.

15. The network forwarding integrated circuit of claim 10, wherein a first packet header field of the first set of packet header fields and a second packet header field of the second set of packet header fields are part of a header for a same protocol.

16. The network forwarding integrated circuit of claim 10, wherein the descriptive data for the particular packet header field further comprises a tag identifying the particular packet header field.

\* \* \* \* \*